United States Patent
Yu et al.

(10) Patent No.: US 7,059,736 B2
(45) Date of Patent: *Jun. 13, 2006

(54) BACKLIGHT MODULE

(75) Inventors: Chuan-Pei Yu, Ilan (TW); Chien-Hung Kuo, Taichung (TW); Han-Chou Liu, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 84 days.

This patent is subject to a terminal disclaimer.

(21) Appl. No.: 10/656,777

(22) Filed: Sep. 4, 2003

(65) Prior Publication Data

US 2004/0257792 A1 Dec. 23, 2004

(30) Foreign Application Priority Data

Jun. 19, 2003 (TW) .................... 92116616 A

(51) Int. Cl.
*G09F 13/04* (2006.01)

(52) U.S. Cl. .................... 362/97; 362/29; 349/60; 349/64; 349/70

(58) Field of Classification Search ................ 362/31, 362/260, 561, 97, 29–30; 349/58, 60, 67, 349/70, 64
See application file for complete search history.

(56) References Cited

U.S. PATENT DOCUMENTS

| | | | | |
|---|---|---|---|---|
| 4,826,294 A * | 5/1989 | Imoto | .......................... | 349/67 |
| 5,138,528 A | 8/1992 | Altman et al. | .............. | 361/760 |
| 5,567,042 A | 10/1996 | Farchmin et al. | ............ | 362/241 |
| RE36,961 E | 11/2000 | Nagano | ...................... | 362/219 |
| 6,561,663 B1 * | 5/2003 | Adachi et al. | .............. | 362/616 |
| 6,700,554 B1 * | 3/2004 | Ham et al. | ................. | 345/75.2 |
| 6,734,926 B1 * | 5/2004 | Fan et al. | ..................... | 349/58 |
| 6,747,404 B1 * | 6/2004 | Rha | ........................... | 313/491 |
| 2002/0044437 A1 * | 4/2002 | Lee | .............................. | 362/31 |
| 2002/0113924 A1 * | 8/2002 | Saito et al. | ................. | 349/112 |
| 2003/0086255 A1 | 5/2003 | Moon et al. | .................. | 362/97 |
| 2004/0012971 A1 * | 1/2004 | Tsai et al. | .................... | 362/390 |

FOREIGN PATENT DOCUMENTS

| | | | |
|---|---|---|---|
| JP | 05-119703 | | 5/1993 |
| JP | 05119313 A | * | 5/1993 |
| JP | 2001-210126 | | 8/2001 |

* cited by examiner

*Primary Examiner*—Stephen Husar
*Assistant Examiner*—Jason Han
(74) *Attorney, Agent, or Firm*—Ladas & Parry LLP

(57) ABSTRACT

A backlight module includes a reflector, a support, a lamp, and a diffuser plate. The support is disposed on the reflector, and the lamp is disposed in the support. The diffuser plate is disposed on the reflector, and a predetermined gap is formed between the support and the diffuser plate. Thus, when the support is expanded, the diffuser plate is abutted by the support.

20 Claims, 3 Drawing Sheets

BACKLIGHT MODULE

BACKGROUND OF THE INVENTION

1. Field of the Invention

The invention relates to a backlight module; in particular, the invention relates to a backlight module that prevents lamp and diffuser deformation.

2. Description of the Related Art

In a liquid crystal display unit of a liquid crystal display, a backlight module is generally utilized as a light source. According to the structure, the backlight module can be divided into an edge type or direct type module. Since this invention seeks to improve the direct type backlight module, the description of the edge type backlight module is omitted.

As shown in FIG. 1, a direct type backlight module 10 includes a reflector 11, a diffuser plate 12, a plurality of lamps 13, and a plurality of supporting columns 14. The reflector 11 is located at the bottom of the backlight module 10, and reflects the light from the lamps 13 out of the backlight module 10. The diffuser plate 12 is disposed on the reflector 11 in a manner such that the lamps 13 are covered by the diffuser plate 12 form the backlight. The lamps 13 are utilized as the light source of the backlight module 10. The supporting columns 14 are disposed between the reflector 11 and the diffuser 12 so as to support the diffuser plate 12. Thus, warping or deformation of the diffuser plate 12 is prevented, and the optical quality of the backlight module 10 can be maintained to a specified standard.

The backlight module 10, however, has the following disadvantage. When the size of the liquid crystal display increases, the size of the lamps in the backlight module also increases, as does the possibility of lamp deformation. Thus, the optical quality of the entire liquid crystal display suffers.

In Japanese Publication No. H05-119703, a backlight module 20 that solves the above problem is disclosed. As shown in FIG. 2, support platens 24 are additionally disposed under the lamps 23 to prevent deformation of the lamps 23. The disadvantage of the backlight module 20 is that as the size of the liquid crystal display increases, the size of the diffuser in the backlight module also increases as does the possibility of diffuser deformation. Thus, the optical quality of the entire liquid crystal display suffers.

Japanese Publication No. 2001-210126, discloses another backlight module 30. As shown in FIG. 3, supporting assemblies 34 are additionally disposed under the lamps 33 to prevent deformation of the lamps 33. Each of the supporting assemblies 34 includes a column 341 to be abutted by the diffuser 32. The diffuser 32 can be maintained at a predetermined position by the columns 341, thus the Mura effect of backlight module can be prevented.

The backlight module 30, however, has the following disadvantages. First, when the supporting assembly 34 is disposed inside the backlight module 30, the diffuser plate 32 is abutted by the columns 341. Thus, when the backlight module 30 is operated, the diffuser 32 may be projected outwardly by the expansion of the columns 341 due to increased temperature inside the backlight module 30. As a result, warping, deformation may occur in the diffuser plate 32. Second, two lamps 33 are simultaneously supported by one supporting assembly 34. When the supporting assembly 34 expands due to increased temperature, the lamps 33 may be moved relative to each other. Thus, the lamps 33 may be damaged. Moreover, the column 341 may be moved due to the thermal expansion of the supporting assembly 34 so that the diffuser 32, abutted by the column 341, may also be damaged.

SUMMARY OF THE INVENTION

In order to address the disadvantages of the aforementioned backlight module, the invention provides a backlight module that can prevent lamp and diffuser deformation.

Accordingly, the invention provides a backlight module including a reflector, a support, a lamp, and a diffuser plate. The support is disposed on the reflector, and the lamp is disposed in the support. The diffuser plate is disposed on the reflector, and a predetermined gap is formed between the support and the diffuser plate. Thus, when the support is expanded, the diffuser plate is abutted by the support.

In a preferred embodiment, the support includes a fixed portion and a retaining portion. The fixed portion is fixed on the reflector or frame, and the retaining portion is integrally formed with the fixed portion. The predetermined gap is formed between the retaining portion and the diffuser plate.

It is understood that the fixed portion may be adhered to the reflector.

Furthermore, the reflector includes a through hole, and the fixed portion is fixed on the reflector by passing through the through hole. The support includes an elastic portion at the fixed portion, and the elastic portion engages with the through hole so that the support is fixed on the reflector.

The diffuser may be abutted by the retaining portion in a point contact manner. Alternatively, the retaining portion may be formed with a curved surface to be abutted by the diffuser plate.

Additionally, a predetermined gap is defined between the support and the lamp so as to prevent the lamp from being damaged by the support when the support is deformed.

It is noted that the support may be made of white or transparent material, and the lamp is surrounded by the support.

In the invention, another backlight module is provided. The backlight module includes a reflector, a diffuser plate, a plurality of lamps, and a plurality of supports. The diffuser plate is disposed on the reflector, and the lamps are disposed between the reflector and the diffuser plate. The supports are disposed on the reflector in a manner such that the supports are abutted by the diffuser plate. Each of the lamps is retained by one of the supports respectively.

BRIEF DESCRIPTION OF THE DRAWINGS

The present invention can be more fully understood by reading the subsequent detailed description and examples with references made to the accompanying drawings, wherein:

FIG. 4b is a schematic view of a support in FIG. 4a;

FIG. 4c is a side view of the backlight module in FIG. 4a;

DETAILED DESCRIPTION OF THE INVENTION

Figure 1:
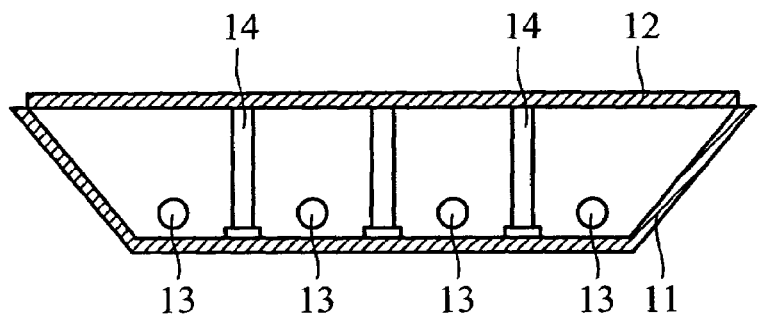
FIG. 1 a schematic view of a conventional backlight module.
Figure 2:
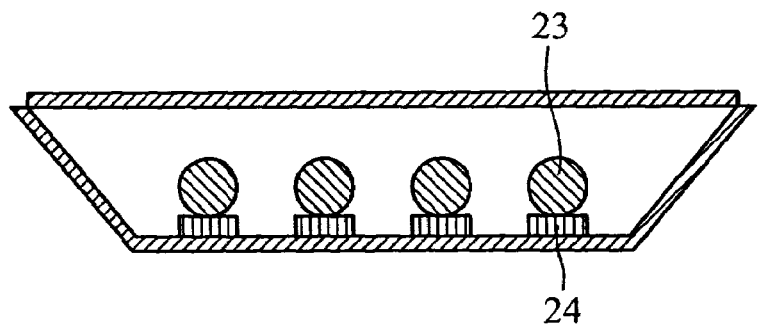
FIG. 2 is a schematic view of another conventional backlight module.
Figure 3:
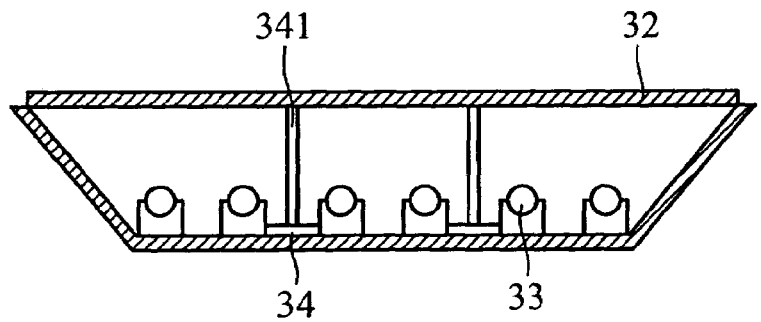
FIG. 3 is a schematic view of another conventional backlight module.
Figure 4A:
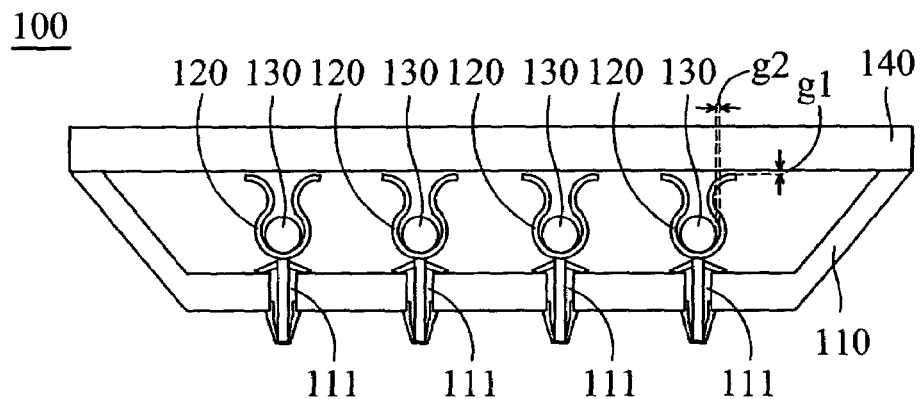
FIG. 4a is a front view of a backlight module as disclosed in the invention, wherein a supporting platen is not illustrated.

FIG. 4a shows a backlight module 100 as disclosed in the invention. The backlight module 100 includes a reflector 110, a plurality of supports 120, a plurality of lamps 130, and a diffuser plate 140. The reflector 110 is located at the bottom of the backlight module 100, and reflects the light from the lamps 130 out of the backlight module 100. The reflector 110 includes a plurality of through holes 111 for the supports 120 passing through.

Figure 4B:
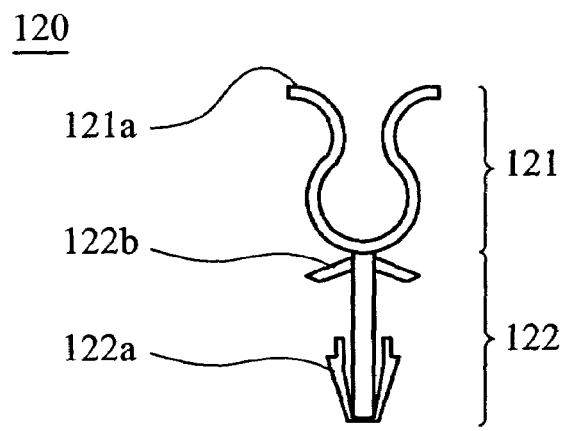

Each of the supports 120 is disposed on the reflector 110 respectively, and is divided into a fixed portion 122 and a retaining portion 121 as shown in FIG. 4b. Each of the fixed portions 122 is fixed on the reflector 110 by passing through the through hole 111 respectively. Each of the retaining portions 121 is integrally formed with the corresponding fixed portion 122. A gap g1 with a predetermined size is formed between the retaining portion 121 and the diffuser plate 140. Thus, when the support 120 is expanded due to thermal factors, the diffuser plate 140 may be abutted by the retaining portion 121. Specifically, when the backlight module 100 is initially assembled, the gap g1 is formed between the supports 120 and the diffuser 140. After prolonged use, the diffuser plate 140 may be deformed downwardly due to its own weight so as to be abutted by the supports 120. It is noted that the Mura effect is not generated by such a deformation. When the temperature inside the backlight module 100 increases during operation, the supports 120 expand and move the diffuser plate 140 to the original position. Thus, the diffuser plate 140 is not deformed outwardly, and maintains its original position. As a result, the Mura effect does not occur in the backlight module 100.

Figure 5A:
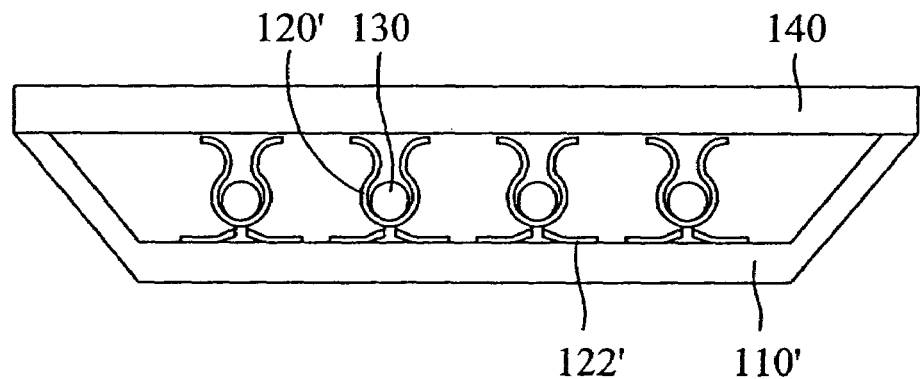
FIG. 5a is a schematic view of a variant embodiment of the support.

Additionally, each of the supports 120 includes two elastic portions 122a at the fixed portion 122. After the fixed portion 122 passes through the through hole 111, the elastic portions 122a engages with the through hole 111 so that the support 120 is fixed on the reflector 110. The support 120 is also formed with two extending portions 122b at the fixed portion 122 so that the support 120 can be stably disposed on the reflector 110. It is noted that the method of fixing the fixed portion 122 is not limited to this. For example, as shown in a backlight module 100' of FIG. 5a, each of the fixed portions 122' includes two plates. The plates of the fixed portions 122' are adhered to the reflector 110' via an adhesive such as double-sided tape.

Figure 5B:
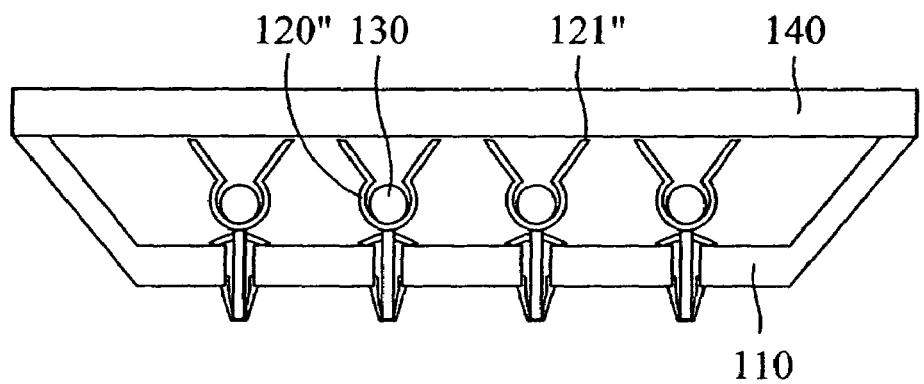
FIG. 5b is a schematic view of another variant embodiment of the support.

As shown in FIGS. 4a and 4b, each of the retaining portions 121 is formed with a curved surface 121a to be abutted by the diffuser 140. The cross section of the entire retaining portion 121 consists of curved surfaces so that the diffuser 140 is stably abutted by the supports 121. It is noted that the retaining portion 121 is not limited to this. For example, as shown in a backlight module 100" of FIG. 5b, each of the retaining portions 121" includes a curved surface and two flat plates. The lamp 130 is surrounded by the curved surface of the retaining portions 121", and the flat plates are extended upwardly from the curved surface so as to be abutted by the diffuser plate 140 in a point contact manner.

It is understood that the supports 120 may be made of white or transparent material so as to not affect the brightness of the backlight module 100. The lamps 130 are surrounded by the supports 120 so that the lamps 130 can be properly retained.

Figure 4C:
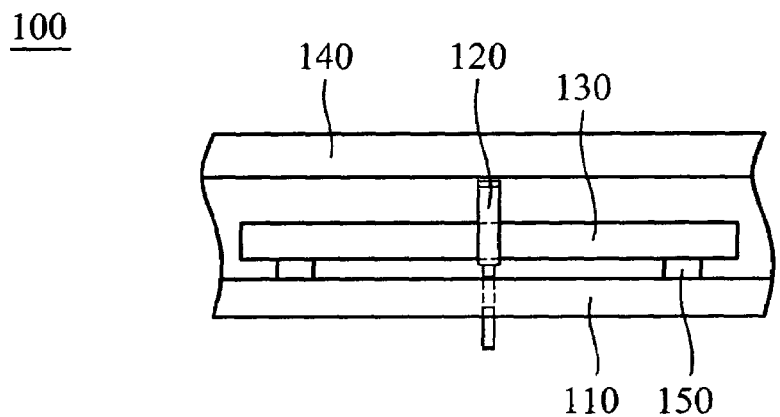

As shown in FIG. 4c, the lamp 130 is retained by the support 130 at its central position; however, it is not limited to this. The position of the support 130 may be adjusted based on the length or the material of the lamp 130, or the size of the diffuser plate 140. Also, one lamp 130 may not be retained by one support 120 as shown in FIG. 4c. For example, one lamp 130 may be retained by several supports 120 based on the size of the lamp 130.

Each of the lamps 130 is utilized as a light source of the backlight module 100, and is disposed in one of the supports 120 respectively. A gap g2 with a predetermined size is defined between the support 120 and the lamp 130. Thus, when the support 120 is deformed by increased temperature, the lamp 130 is not damaged by the support 120.

The diffuser plate 140 is utilized for uniformly emitting the light of the backlight module 100, and is disposed on the reflector 110. A gap g1 is formed between the diffuser plate 140 and the supports 120.

It is understood that the backlight module 100 further includes two supporting platens 150, for retaining the ends of the lamps 130, as shown in FIG. 4c.

As stated above, since the supports are disposed between the diffuser plate and the reflector, warping or deformation of the lamps and the diffuser plate is prevented. Moreover, the small gap formed between the diffuser plate and the supports prevents the diffuser plate from projecting outwardly due to increased temperature. The small gap formed between the lamp and the support additionally prevents damage to the lamp from the support due to increased temperature. Finally, since one lamp is retained by one support, the lamp is stable.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module comprising:
   a reflector;
   a support disposed on the reflector;
   a lamp disposed in the support; and
   a diffuser plate disposed on the reflector, wherein a first gap with a predetermined size is formed between the support and the diffuser plate so that the diffuser plate is abutted by the support when the support is expanded.

2. The backlight module as claimed in claim 1, wherein the support comprises:
   a fixed portion fixed on the reflector; and
   a retaining portion integrally formed with the fixed portion, wherein the first gap is formed between the retaining portion and the diffuser plate so that the diffuser plate is abutted by the retaining portion when the support is expanded.

3. The backlight module as claimed in claim 2, wherein the fixed portion is adhered to the reflector.

4. The backlight module as claimed in claim 2, wherein the reflector includes a through hole, and the fixed portion is fixed on the reflector by passing through the through hole.

5. The backlight module as claimed in claim 4, wherein the support includes an elastic portion at the fixed portion and the elastic portion engages with the through hole so that the support is fixed on the reflector.

6. The backlight module as claimed in claim 2, wherein the diffuser plate is abutted by the retaining portion in a point contact manner.

7. The backlight module as claimed in claim 2, wherein the retaining portion is formed with a curved surface to be abutted by the diffuser.

8. The backlight module as claimed in claim 1, wherein a second gap with a predetermined size is defined between the support and the lamp so as to prevent the lamp from being damaged by the support when the support is deformed.

9. The backlight module as claimed in claim 1, wherein the support is made of white or transparent material.

10. The backlight module as claimed in claim 1, wherein the lamp is surrounded by the support.

11. A backlight module comprising:
   a reflector;
   a diffuser plate disposed on the reflector;
   a plurality of lamps disposed between the reflector and the diffuser plate; and
   a plurality of supports disposed on the reflector in a manner such that the supports are abutted by the diffuser plate, wherein each of the lamps is retained by one of the supports respectively.

12. The backlight module as claimed in claim 11, wherein each of the supports comprises:
   a fixed portion fixed on the reflector; and
   a retaining portion integrally formed with the fixed portion, wherein a first gap with a predetermined size is formed between the retaining portion and the diffuser plate so that the diffuser plate is abutted by the retaining portion when the support is expanded.

13. The backlight module as claimed in claim 12, wherein the fixed portion is adhered to the reflector.

14. The backlight module as claimed in claim 12, wherein the reflector includes a through hole, and the fixed portion is fixed on the reflector by passing through the through hole.

15. The backlight module as claimed in claim 14, wherein each of the supports includes an elastic portion at the fixed portion, and the elastic portion engages with the through hole so that the support is fixed on the reflector.

16. The backlight module as claimed in claim 12, wherein the diffuser plate is abutted by the retaining portion in a point contact manner.

17. The backlight module as claimed in claim 12, wherein the retaining portion is formed with a curved surface to be abutted by the diffuser plate.

18. The backlight module as claimed in claim 11, wherein a second gap with a predetermined size is defined between the support and the corresponding lamp so as to prevent the lamp from being damaged by the support when the support is deformed.

19. The backlight module as claimed in claim 11, wherein the supports are made of whiteor transparent material.

20. The backlight module .as claimed in claim 11, wherein each of the lamps is surrounded by one of the supports respectively.

* * * * *